(12) United States Patent  (10) Patent No.: US 7,441,648 B1
Kitazumi et al.  (45) Date of Patent: Oct. 28, 2008

(54) SYSTEMS AND METHODS FOR TRANSPORT THROUGH CURVES

(75) Inventors: Barry Kitazumi, Milpitas, CA (US); Benjamin T. Davidson, Sunnyvale, CA (US)

(73) Assignee: Aquest Systems Corporation, Sunnyvale, CA (US)

( * ) Notice: Subject to any disclaimer, the term of this patent is extended or adjusted under 35 U.S.C. 154(b) by 0 days.

(21) Appl. No.: 11/818,657

(22) Filed: Jun. 14, 2007

(51) Int. Cl.
*B65G 15/12* (2006.01)
*B65G 21/16* (2006.01)

(52) U.S. Cl. .................. 198/623; 198/817; 198/604; 198/465.3

(58) Field of Classification Search .............. 198/465.3, 198/304, 623, 817, 831
See application file for complete search history.

(56) References Cited

U.S. PATENT DOCUMENTS

| | | | |
|---|---|---|---|
| 3,105,334 A | 10/1963 | Marshall | |
| 3,380,459 A * | 4/1968 | Schmermund | ............... 131/94 |
| 3,570,684 A | 3/1971 | Cowan | |
| 3,976,202 A | 8/1976 | Bauvin | |
| 4,217,977 A | 8/1980 | Tam | |
| 4,479,572 A * | 10/1984 | Merz | ....................... 198/345.3 |
| 4,779,715 A | 10/1988 | Pazdernik | |
| 4,817,781 A | 4/1989 | Folk | |
| 5,884,753 A * | 3/1999 | Robertson et al. | ........ 198/803.2 |
| 5,951,016 A | 9/1999 | Bateman | |
| 6,280,134 B1 | 8/2001 | Nering | |
| 6,308,818 B1 * | 10/2001 | Bonora et al. | ............. 198/465.1 |
| 6,390,282 B1 | 5/2002 | Ouellette | |
| 6,533,104 B1 | 3/2003 | Starlinger-Huemer | |
| 6,848,882 B2 | 2/2005 | Chen | |
| 6,889,817 B2 * | 5/2005 | Leisner | ..................... 198/465.2 |
| 7,281,623 B1 * | 10/2007 | Kitazumi et al. | ............. 198/799 |
| 2002/0119036 A1 | 8/2002 | Huber | |
| 2006/0257233 A1 | 11/2006 | Bonora | |

* cited by examiner

*Primary Examiner*—Mark A Deuble
(74) *Attorney, Agent, or Firm*—Carr & Ferrell LLP

(57) ABSTRACT

A transport system including a curved conveyance section configured for moving articles along a curved conveyance path. At least one turnstile wheel is configured to guide the articles along the curved conveyance path. In some embodiments, the turnstile wheel comprises a first surface configured to guide an exterior vertical belt along a continuous curve on an exterior edge of the curved conveyance path and a second surface configured to guide an interior vertical belt along a continuous curve on an interior edge of the curved conveyance path. The first surface and the second surface are configured to have a common axis of rotation outside the curved conveyance path and to rotate at a same angular velocity. The interior vertical belt and the exterior vertical belt are configured to support the articles as the articles are conveyed along the curved conveyance path. The articles are conveyed along the curved conveyance path without stopping or significantly slowing down. The articles conveyed may include semiconductor wafers or substrates for the manufacture of display devices.

34 Claims, 11 Drawing Sheets

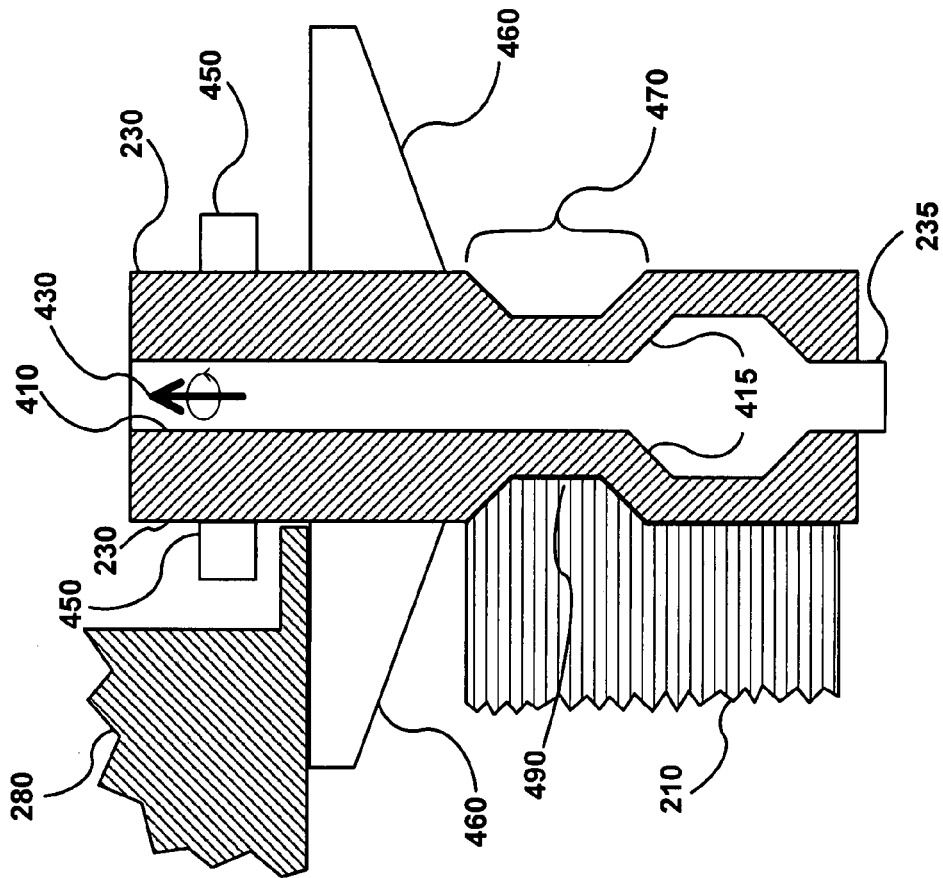
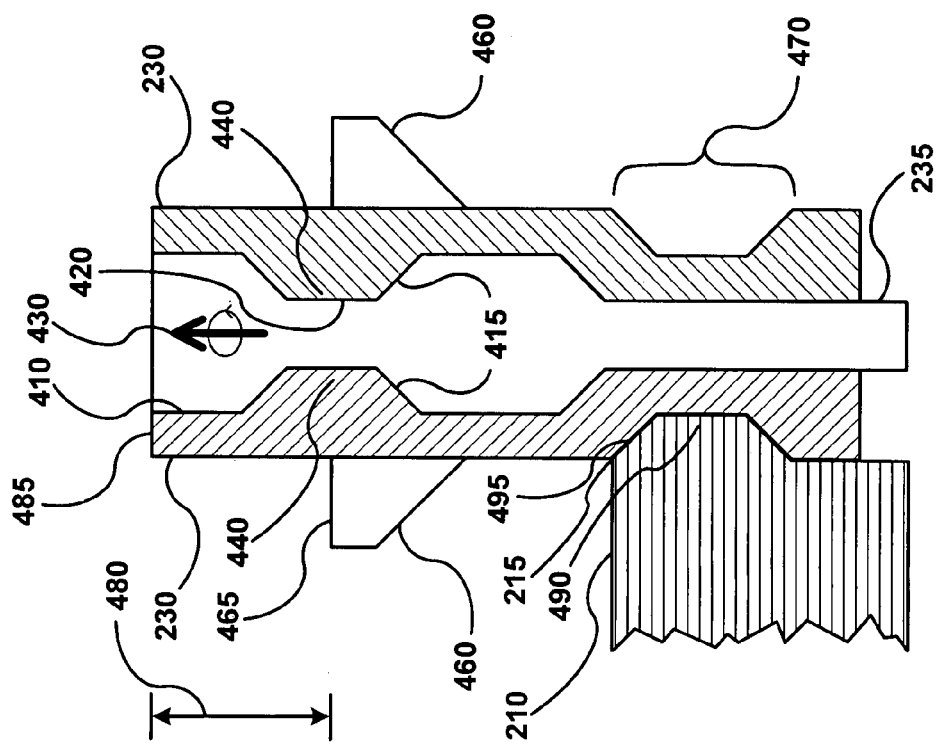
FIG. 4B
FIG. 4A

SYSTEMS AND METHODS FOR TRANSPORT THROUGH CURVES

BACKGROUND OF THE INVENTION

1. Field of the Invention

The present invention relates generally to transport systems and methods for conveying articles along a conveyance path, and in some embodiments to conveying semiconductor substrates, or the like, in a fabrication facility.

2. Description of Related Art

Transport systems are widely employed in industrial manufacturing facilities to convey articles between work stations. Originally, these systems were manual and workers moved articles by hand or by cart. Modern factories have developed specialized equipment to convey articles automatically. In particular, semiconductor fabrication facilities currently use automated transport systems to move semiconductor wafers during the manufacturing process. Typically, a batch of wafers may be conveyed together in a container known as a Front Opening Unified Pod (FOUP). Semiconductor wafer manufacturers have sought to increase manufacturing productivity by using transport systems that quickly and efficiently convey wafers from machine to machine without exposing the wafers to excessive contamination, excessive vibration, or excessive acceleration and deceleration forces. One problem with existing transport systems used in the semiconductor manufacturing industry is the difficulty of changing or turning the direction of conveyance of an article, such as a FOUP, without momentarily stopping its forward motion. This wait leads to a bottleneck that limits the throughput and efficiency of such transport systems.

FIG. 1A illustrates a top view of a prior art transport cornering system. This system comprises a conveyor 110 including a belt 111 and a belt 112, and a conveyor 120 including a belt 121 and a belt 122. This system also comprises a turntable 130 configured to receive an article 140 from conveyor 110, rotate the article 140, and deliver the article 140 to conveyor 120. The turntable 130 comprises a belt 131 and a belt 132 on either side of the turntable 130, and an axis of rotation 133. A corner region 160 is shown magnified in FIG. 1B, FIG. 1C, and FIG. 1D. These FIGs. show the turntable 130 in successive stages of rotation as it delivers the article 140 from conveyor 110 to conveyor 120. The conveyor 110 uses the belt 111 and the belt 112 to transport the article 140 toward the turntable 130, where the article 140 is turned and delivered to the conveyor 120. The axis of rotation 133 is typically disposed between the belt 131 and the belt 132 on the turntable 130. Thus, a conveyance path of the article 140 passes through the axis of rotation 133.

When the article 140 reaches the corner region 160 and is approximately centered over the axis of rotation 133, the article 140 typically stops while the turntable 130 rotates to position the article 140 such that it may be delivered to the conveyor 120. The turntable 130 typically has a capacity to carry only one article 140 at a given time. The distance traveled per unit time by the article 140 through the corner region 160 is typically lower than the distance traveled per unit time by the article 140 over the conveyor 110 or the conveyor 120. To compensate for this, space is allocated between adjacent articles 140 on conveyors 110 and 120. As a result, the corner region 160 typically becomes a bottleneck in a transport system. Therefore, there is a need for improved systems and methods for changing or turning the direction of conveyance of articles in manufacturing facilities.

SUMMARY OF THE INVENTION

The present invention comprises, in various embodiments, a transport system including a curved conveyance section configured for moving articles along a curved conveyance path. In various embodiments, the curved conveyance section comprises two approximately vertical belts referred to as an exterior corner belt and an interior corner belt. The exterior corner belt is disposed on an exterior edge of the curved conveyance path and the interior corner belt is disposed on an interior edge of the curved conveyance path. The exterior corner belt and the interior corner belt are typically continuously curved through the curved conveyance section.

In various embodiments, a turnstile wheel is configured to guide both the interior corner belt and the exterior corner belt around a common axis of rotation, e.g., an axis of rotation of the turnstile wheel. As further described herein, a path of each belt is determined by respective surfaces of the turnstile wheel. Because these surfaces of the turnstile wheel share the same axis of rotation, both the interior corner belt and the exterior corner belt are guided at essentially the same angular velocity. Further, because the surfaces of the turnstile wheel travel in a continuously curved path, both the interior corner belt and the exterior corner belt are guided in a continuously curved path.

The turnstile wheel is disposed partially under or over the conveyance path to guide movement and/or position of both the interior corner belt and the exterior corner belt. This configuration optionally allows the article conveyed to move through the curved conveyance section at a velocity approximately equal to a velocity at which the article approaches the curved conveyance section; e.g., the article can pass through the curved conveyance section without stopping and/or significantly slowing down. In some embodiments of the present invention, the curved conveyance section is configured to transport containers known as Front Opening Unified Pods (FOUPs) and/or substrates configured for the manufacture of a display device.

Various embodiments of the invention include a curved conveyance section comprising an exterior corner belt disposed on an exterior edge of the curved conveyance section, and configured to guide an article to be conveyed, an interior corner belt disposed on an interior edge of the curved conveyance section, and configured to guide the article to be conveyed, a first surface configured to guide the exterior corner belt along a continuously curved path, a second surface configured to guide the interior corner belt along a continuously curved path, the first surface and the second surface being configured to rotate at a similar angular velocity.

Various embodiments of the invention include a curved conveyance section comprising an interior corner belt disposed on an interior edge of the curved conveyance section, and configured to guide an article to be conveyed along a curved conveyance path, an exterior corner belt disposed on an exterior edge of the curved conveyance section, and configured to guide the article to be conveyed along the curved conveyance path, at least one turnstile wheel configured to guide both the interior corner belt and the exterior corner belt, an axis of rotation of the at least one turnstile wheel being disposed outside of the curved conveyance path.

Various embodiments of the invention include a curved conveyance section comprising an interior corner belt disposed on an interior edge of the curved conveyance section, and configured to transport an article to be conveyed along a curved conveyance path, an exterior corner belt disposed on an exterior edge of the curved conveyance section, and configured to transport the article to be conveyed along the curved conveyance path, at least one turnstile wheel including a first surface configured to guide the exterior corner belt and a second surface configured to guide the interior corner belt, the first surface and the second surface having a common axis of rotation.

Various embodiments of the invention include a method comprising loading an article onto a curved conveyance section, the curved conveyance section comprising an interior corner belt and an exterior corner belt configured to guide the article to be conveyed along a curved conveyance path, and at least one turnstile wheel configured to guide the interior corner belt and the exterior corner belt around a common axis of rotation, conveying the article along the curved conveyance path through the curved conveyance section, and unloading the article from the curved conveyance section.

Various embodiments of the invention include a curved conveyance section comprising at least one turnstile wheel configured to guide an article to be conveyed through a curved conveyance path, the turnstile wheel comprising a first surface and a second surface, the first surface and the second surface having a common axis of rotation disposed outside of the curved conveyance path, and the second surface being disposed below the curved conveyance path.

Various embodiments of the invention include a system comprising a first conveyance section configured for transporting an article in a first direction and including at least a first vertical belt configured to travel at a first speed, a second conveyance section configured for transporting an article in a second direction and including at least a second vertical belt configured to travel at a second speed, the first speed being different from the second speed, and a transition region between the first vertical belt and the second vertical belt and including an offset section at least partially perpendicular to the first direction or the second direction, the offset section configured for the article to begin a change in direction within the transition region.

BRIEF DESCRIPTION OF THE DRAWINGS

For a more complete understanding of the present invention and for further features and advantages, reference is made to the following description taken in conjunction with the accompanying drawings, in which:

FIGS. 4A, 4B, 4C, and 4D illustrate cross-sectional views of alternative embodiments of an exterior corner belt, a turnstile wheel, and a plurality of exterior corner belt guide wheels, according to various embodiments of the invention;

DETAILED DESCRIPTION OF THE INVENTION

Various embodiments of the present invention include improved systems and methods for automatically turning or changing the direction of conveyance of articles, such as FOUPs or substrates configured for the manufacture of a display device. For example, some embodiments include the use of vertical rollers and belts to efficiently propel articles along a conveyance path through a corner, thereby changing the direction of conveyance of the articles without stopping and/or significantly slowing the articles. Various embodiments also include the use of turnstile wheels configured to control the relative velocity of the vertical rollers and belts on either side of the conveyance path, and thus to propel the articles in a conveyance direction through a corner at an approximately constant velocity. In various embodiments, the corner includes gradual or sharp curves, for example between 1 and 180 degrees.

Figure 1A:
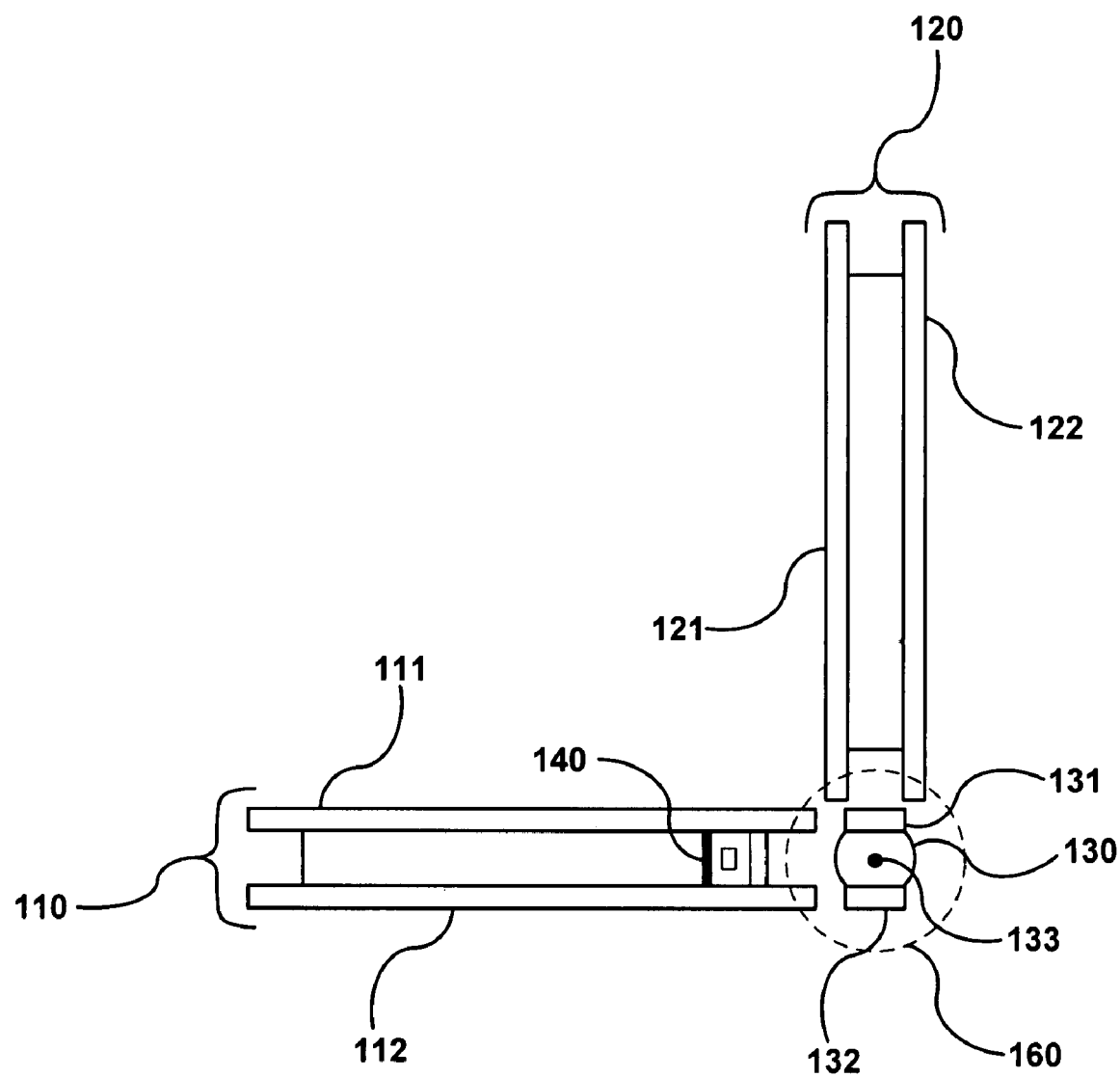
FIG. 1A illustrates a top view of a prior art transport cornering system.
Figure 1D:
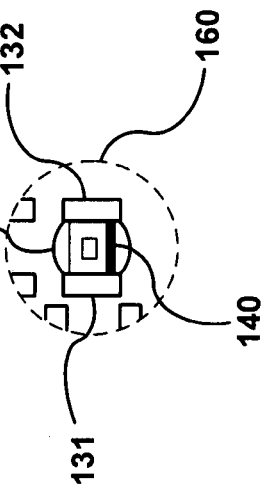
FIGS. 1B, 1C, and 1D illustrate a portion of FIG. 1A, showing an article in successive stages of rotation through a corner.
Figure 1C:
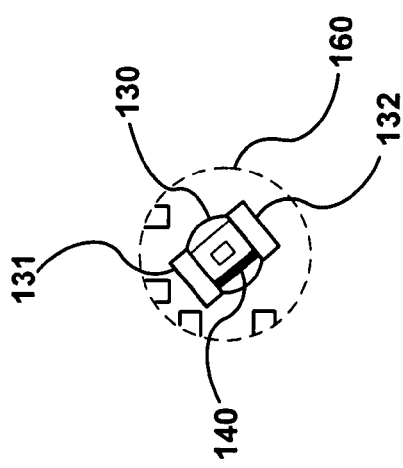
Figure 1B:
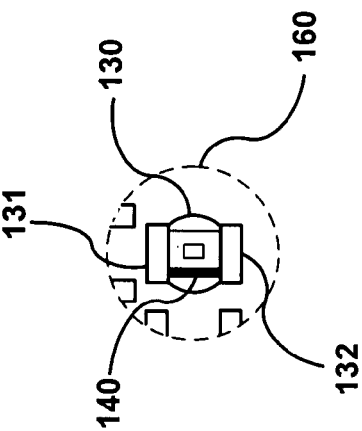
Figure 2A:
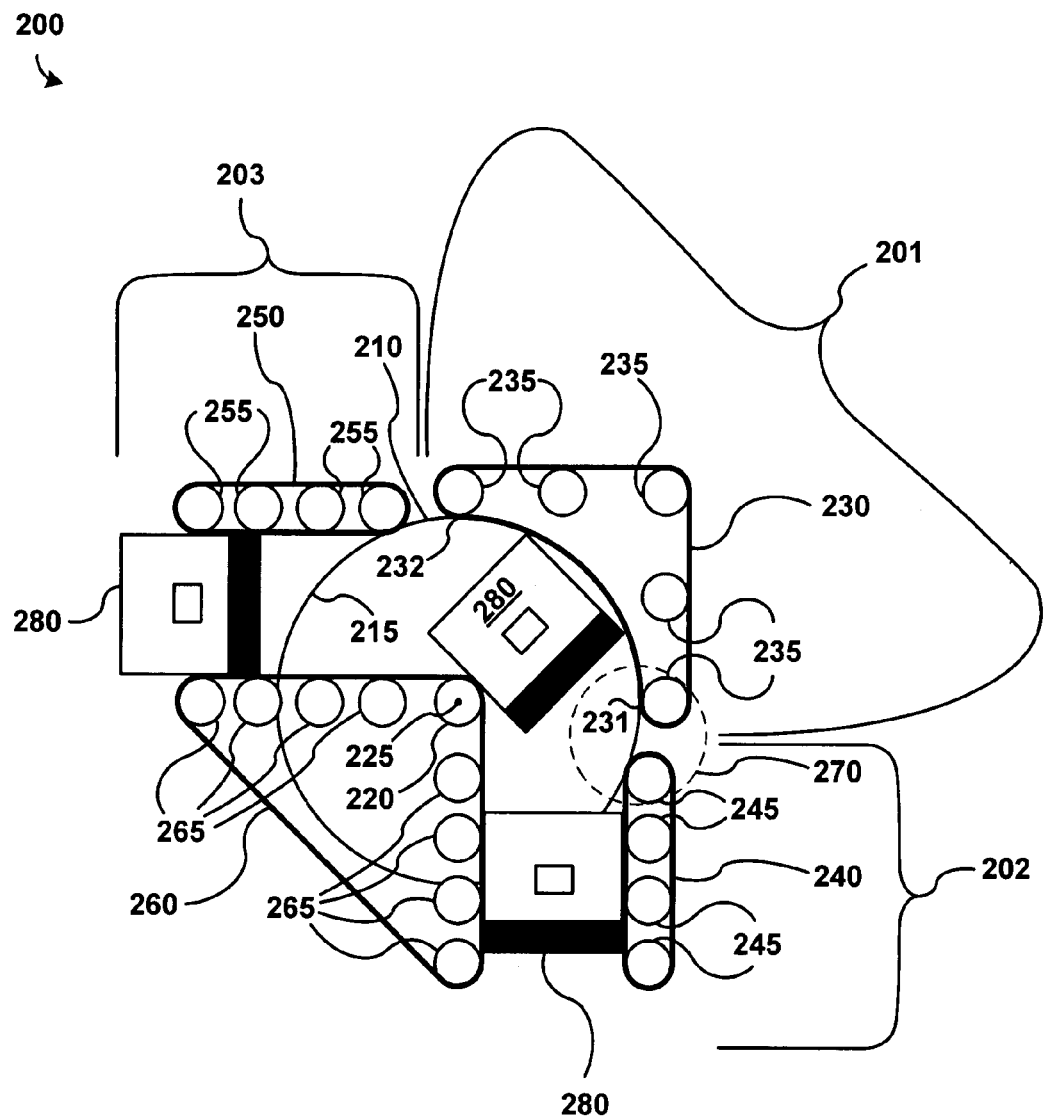
FIG. 2A illustrates a top view of a transport cornering system, according to various embodiments of the invention.

FIG. 2A illustrates a top view of a transport cornering system 200, according to various embodiments of the invention. The transport cornering system 200 comprises a curved conveyance section 201, an entrance conveyance section 202, and an exit conveyance section 203. The curved conveyance section 201 comprises a turnstile wheel 210 that rotates about an axis of rotation 225, an exterior corner belt 230, a plurality of exterior corner belt guide wheels 235, and an interior corner belt 260. The region between the interior corner belt 260 and the exterior corner belt 230, from a first exterior curve point 231 to a second exterior curve point 232, includes a curved conveyance path for the article 280. The exterior corner belt 230 is disposed along an exterior edge of the curved conveyance path. The interior corner belt 260 is disposed along an interior edge of the curved conveyance path. A plurality of the articles 280 may enter the transport cornering system 200 for transport through the curved conveyance path, passing over or under a portion of the turnstile wheel 210, and rotating about the axis of rotation 225.

The turnstile wheel 210 comprises an exterior turnstile wheel surface 215 and an interior turnstile wheel surface 220. The exterior turnstile wheel surface 215 is configured to guide the exterior corner belt 230 and the interior turnstile wheel surface 220 is configured to guide the interior corner belt 260. The exterior turnstile wheel surface 215 and the interior turnstile wheel surface 220 are configured to rotate about a common vertically-oriented axis of rotation 225. In various embodiments, the exterior turnstile wheel surface 215 is disposed completely below the articles 280 to be conveyed through the curved conveyance section 201. In some embodiments, the interior turnstile wheel surface 220 and the exterior turnstile wheel surface 215 are both integral parts of the same physical turnstile wheel 210. In other embodiments, the interior turnstile wheel surface 220 is an integral part of a first turnstile wheel component, and the exterior turnstile wheel surface 215 is an integral part of a second turnstile wheel component. The first turnstile wheel component and the second turnstile wheel component may be coupled together to collectively form the turnstile wheel 210 assembly, for example by a common spindle.

In still other embodiments, the first turnstile wheel component and the second turnstile wheel component are physically decoupled from one another. For example, the first turnstile wheel component comprising the interior turnstile wheel surface 220 may not physically touch the second turnstile wheel component comprising the exterior turnstile wheel surface 215, and the first turnstile wheel component may rotate around a separate spindle from the second turnstile wheel component. In these embodiments, rotation of the exterior turnstile wheel surface 215 and rotation of the interior turnstile wheel surface 220 are controlled such that each rotates at a same angular velocity. In some embodiments, the first turnstile wheel component and the second turnstile wheel component rotate under the power of a common power source. In other embodiments, the first turnstile wheel component rotates under the power of a first power source, and the second turnstile wheel component rotates under the power of a second power source, the first power source and the second power source being physically decoupled from one another.

In some embodiments, the exterior turnstile wheel surface 215 is configured to maintain a continuous curve in the portion of the exterior corner belt 230 that comes in contact with the exterior turnstile wheel surface 215. Likewise, the interior turnstile wheel surface 220 may be configured to maintain a continuous curve in the portion of the interior corner belt 260 that comes in contact with the interior turnstile wheel surface 220. Thus, the exterior corner belt and the interior corner belt are optionally continuously curved through the curved conveyance section. This is in contrast to systems (such as those disclosed in U.S. application No. 11,406,569 entitled "Transport System Including Vertical Rollers," filed Apr. 18, 2006, which is hereby incorporated herein by reference) in which a conveyance path to change the direction of conveyance of an article is formed by the placement of belts on either side of the conveyance path and guided by a series of guide wheels, the guide wheels being offset from one another such that the direction of travel of the belts changes between one guide wheel and another. In such a system, the belts and thus the conveyance path is piecewise linear, being essentially straight from one guide wheel to the next, and changing direction only at each of the several guide wheels.

In some embodiments, the exterior corner belt 230 comes in contact with the exterior turnstile wheel surface at the first exterior curve point 231, and ceases to make contact with the exterior turnstile wheel surface at the second exterior curve point 232. The interior turnstile wheel surface 220 and the exterior turnstile wheel surface 215 are configured to move the interior corner belt 260 and the exterior corner belt 230 at a same angular velocity about the axis of rotation 225. Therefore, the linear velocity of the exterior corner belt 230 is greater than the linear velocity of the interior corner belt 260.

In various embodiments, one or more exterior corner belt guide wheels 235 and the exterior turnstile wheel surface 215 make contact with the exterior corner belt 230 on opposing sides of the exterior corner belt 230. In some embodiments, some instances of the exterior corner belt guides wheels 235 make contact with the exterior corner belt 230 at a point directly opposite a point where the exterior turnstile wheel surface 215 makes contact with the exterior corner belt 230, such as at the first exterior curve point 231 and the second exterior curve point 232. In some embodiments, a point where an instance of the exterior corner belt guides wheels 235 makes contact with the exterior corner belt 230 and a point where the exterior turnstile wheel surface 215 makes contact with the exterior corner belt 230 are displaced from each other along the length of the belt.

In various embodiments, the entrance conveyance section 202 receives the article 280 from a source disposed outside of the transport cornering system 200 and delivers the received article 280 to the curved conveyance section 201. The entrance conveyance section 202 comprises an exterior entrance belt 240, a plurality of exterior entrance belt guide wheels 245, the interior corner belt 260, and a subset of the interior corner belt guide wheels 265. The plurality of exterior entrance belt guide wheels 245 are configured to guide the exterior entrance belt 240. The plurality of interior corner belt guide wheels 265 are configured to guide the interior corner belt 260. The region between the interior corner belt 260 and the exterior entrance belt 240 includes an entrance conveyance path for the article 280. The exterior entrance belt 240 is configured to move at the same linear velocity as the interior corner belt 260, and thus to guide the article 280 into the transport cornering system 200. Because the exterior corner belt 230 and the interior corner belt 260 are configured to move at the same angular velocity and different linear velocities, the exterior entrance belt 240 and the exterior corner belt 230 move at different linear velocities. The faster linear velocity of the exterior corner belt 230 relative to the interior corner belt 260, combined with the curvature of the exterior corner belt 230 around the axis of rotation 225, causes the article 280 entering the curved conveyance section 201 to begin to turn in the direction of the exit conveyance section 203.

A transition region 270 between the entrance conveyance section 202 and the curved conveyance section 201 provides the necessary guidance and support for the articles 280 as they leave the entrance conveyance section 202, enter the curved conveyance section 201, and change their direction of travel. The transition region 270 is magnified in FIGS. 2B and 2C. In some embodiments, a transition region (not shown) similar to the transition region 270 may be disposed on the interior side of the curved conveyance section 201. In these embodiments, the instance of the transition region 270 on the exterior side of the curved conveyance section 201 is optional. In various embodiments, a transition region (not shown) similar to the transition region 270 may be disposed between the curved conveyance section 201 and the exit conveyance section 203 on either the interior side or the exterior side of the curved conveyance section 201.

In various embodiments, the exit conveyance section 203 receives the articles 280 from the curved conveyance section 201 and delivers them to a location disposed outside the transport cornering system 200. The exit conveyance section 203 comprises an exterior exit belt 250, a plurality of exterior exit belt guide wheels 255, the interior corner belt 260, and a subset of the interior corner belt guide wheels 265.

The plurality of exterior exit belt guide wheels 255 are configured to guide the exterior exit belt 250. The plurality of interior corner belt guide wheels 265 are configured to guide the interior corner belt 260. The region between the interior corner belt 260 and the exterior exit belt 250 includes an exit conveyance path of the article 280. The exterior exit belt 250 is configured to move at the same linear velocity as the interior corner belt 260, and thus to guide the article 280 out of the transport cornering system 200.

Figure 2B:
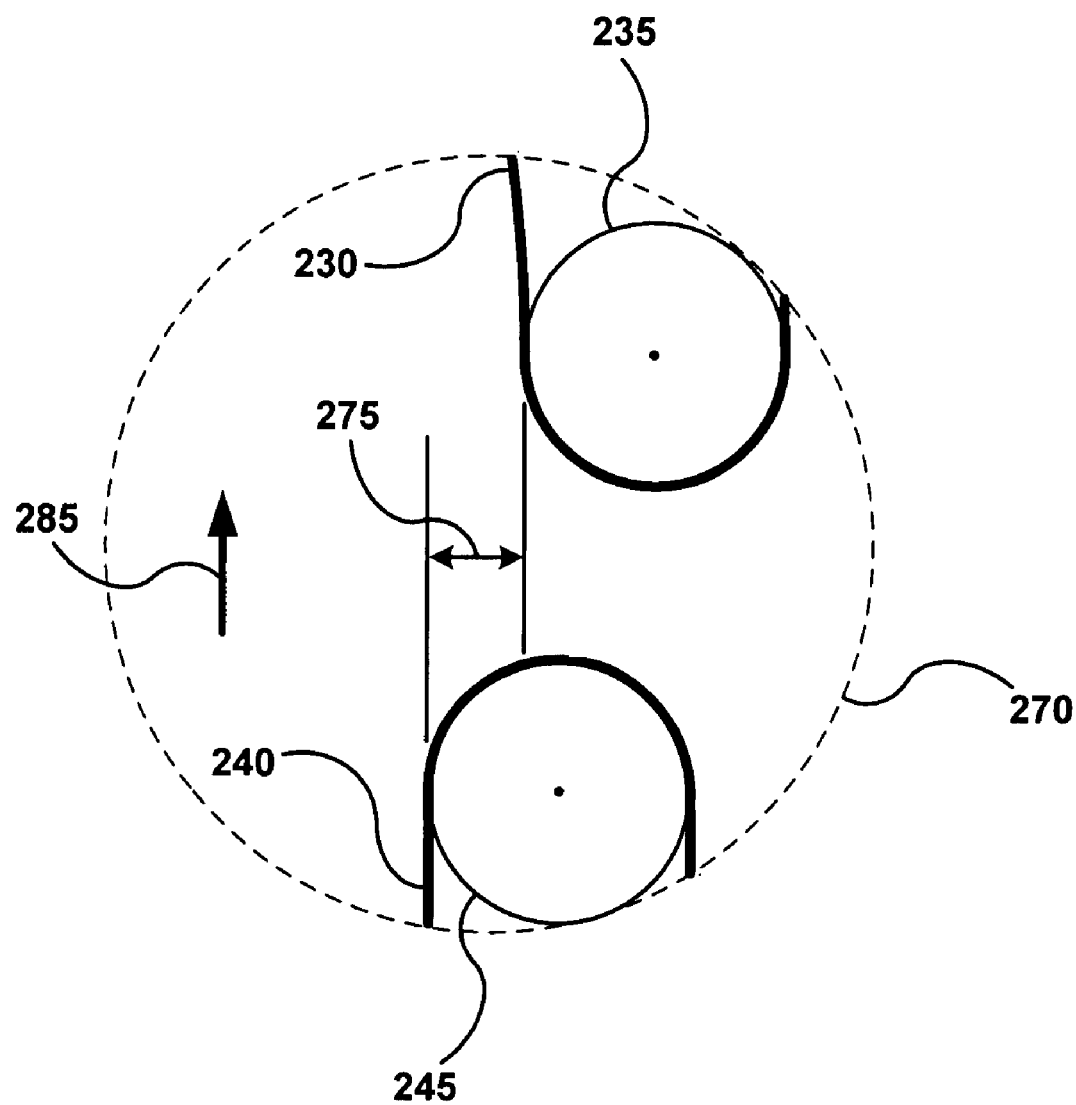
FIG. 2B illustrates a portion of FIG. 2A, enlarged for magnification purposes to illustrate a horizontal offset, according to various embodiments of the invention.

FIG. 2B illustrates a portion of the transport cornering system 200, enlarged for magnification purposes to illustrate a horizontal offset, according to various embodiments of the invention. A portion of the turnstile wheel 210 shown in the transition region 270 in FIG. 2A is not shown in FIG. 2B for clarity. The transition region 270 comprises part of the exterior corner belt 230, part of the exterior entrance belt 240, an exterior entrance belt guide wheel 245, and an exterior corner belt guide wheel 235. The transition region 270 is typically configured to provide a horizontal offset distance 275 between a position of the exterior entrance belt 240 and apposition of the exterior corner belt 230. This horizontal offset is perpendicular to a direction 285 of travel of the article 280 through the conveyance path. In some embodiments, the horizontal offset distance 275 is configured to enable the article 280 within the conveyance path to disengage from the exterior entrance belt 240 before the article 280 is engaged by the exterior corner belt 230. Thus, one side of the article 280 is typically not engaged by two different belts, traveling at different speeds, at the same time. When the transition region 270 is disposed between transport sections configured to transport a FOUP in different directions, then the horizontal offset is configured to allow the FOUP to begin a change in direction within transition region 270.

Figure 2C:
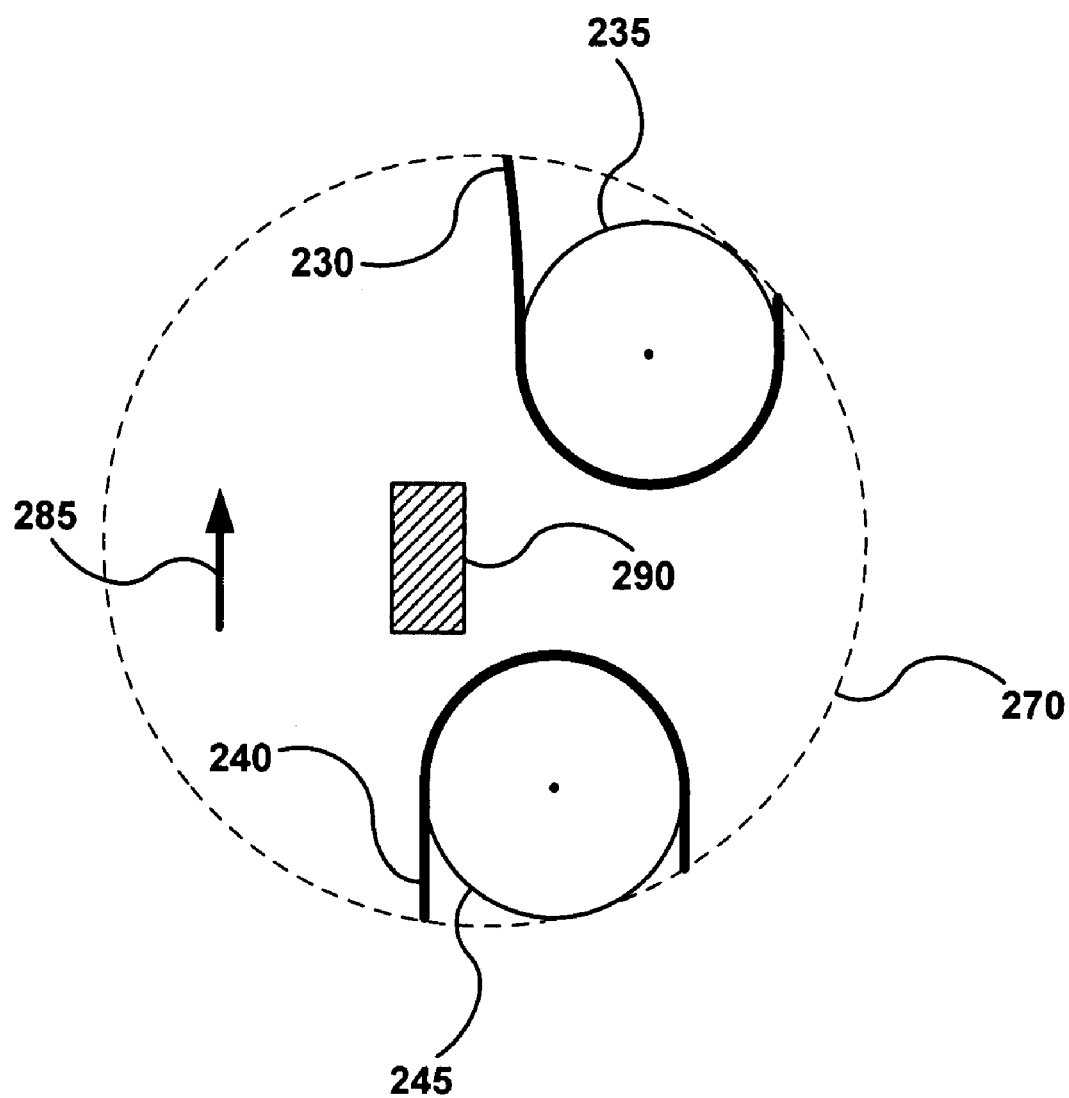
FIG. 2C illustrates a portion of FIG. 2A, enlarged for magnification purposes to illustrate the placement of an optional support structure within the transition region, according to various embodiments of the invention.

FIG. 2C illustrates a portion of the transport cornering system 200, enlarged for magnification purposes to illustrate the placement of an optional support structure 290 within the transition region 270, according to various embodiments of the invention. A portion of the turnstile wheel 210 shown in the transition region 270 in FIG. 2A is not shown in FIG. 2C for clarity. In various embodiments, one or more support structures 290 may be configured to provide guidance and/or support to the article 280 as the article 280 transitions from being guided by the exterior entrance belt 240 to being guided by the exterior corner belt 230. In some embodiments, the support structure 290 may be configured to approximately match the horizontal or rotational movement of the article 280. For example, the one or more support structures 290 may be configured to move vertically or horizontally away from the article 280, approximately perpendicular to the direction 285 of travel of the article 280 through the conveyance path, as the article 280 makes contact with the exterior corner belt 230 and begins rotating about the axis of rotation 225.

In various embodiments, the one or more support structures 290 include one or more transition wheels. The transition wheels may be configured to rotate at a speed matched to the speed of the article 280. This may reduce potential friction and stresses due to velocity mismatches. In some embodiments, the transition wheel is magnetically coupled to a drive mechanism that causes the transition wheel to rotate at a specific velocity. For example, the drive mechanism causing the exterior entrance belt guide wheels 245 to rotate may also be magnetically coupled to a drive mechanism causing the transition wheels to rotate. In some embodiments, the transition wheel may be attached to a lever and/or a spring that enables the transition wheel to move vertically or horizontally away from the article 280, approximately perpendicular to the direction 285 of travel of the article 280 through the conveyance path, as the article 280 makes contact with the exterior corner belt 230 or begins rotating about the axis of rotation 225.

In various embodiments, the one or more support structures 290 include one or more air bearings. The air bearings may be configured to provide an air stream providing physical support to the article 280 when the article 280 travels between the exterior entrance belt 240 and the exterior corner belt 230. The air bearings may optionally be configured to output a significantly reduced air stream or no air stream when the article 280 is not in the path of the air stream. For example, the air bearing may be configured to only output the air stream directly upward if the article 280 is above the air bearing, and to output a reduced air stream when there is no article 280 above the air bearing.

Figure 3:
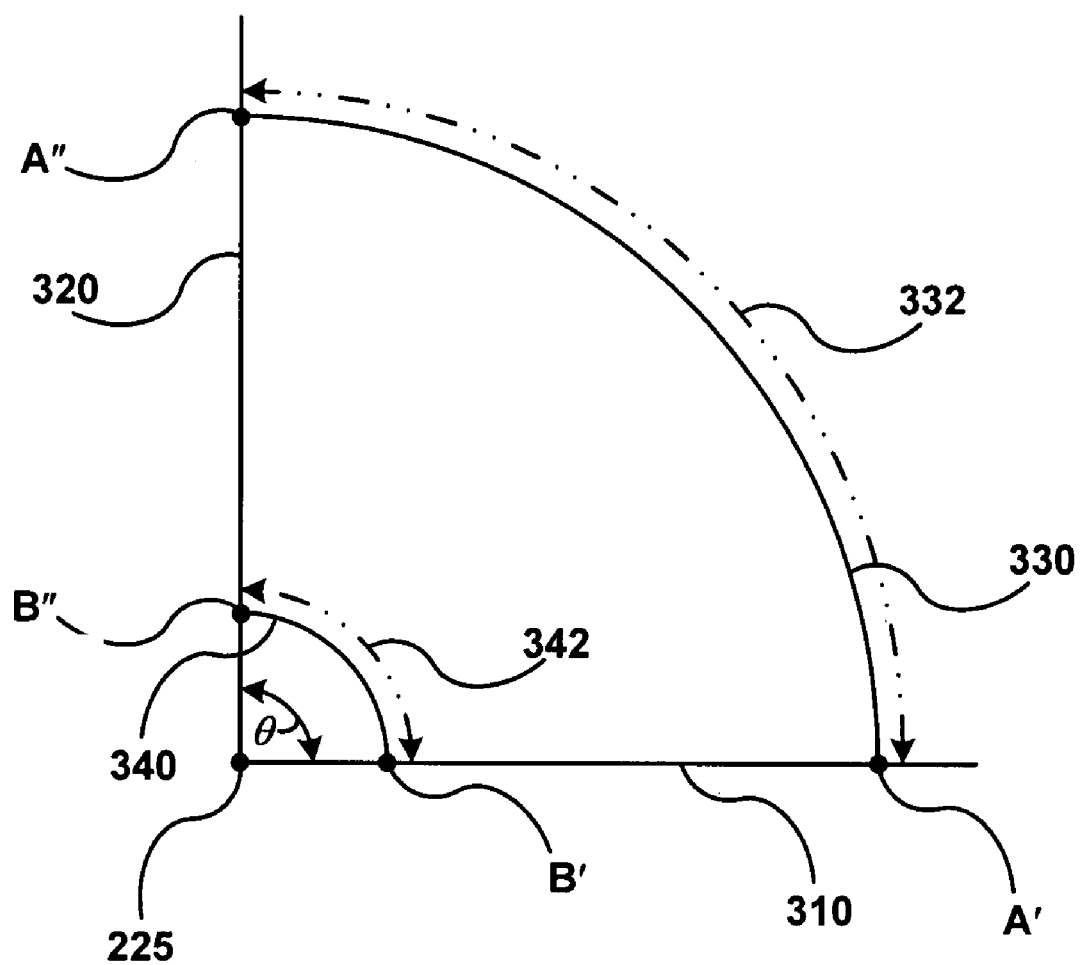
FIG. 3 illustrates the relationships between linear velocity and angular velocity of the external corner belt and the interior corner belt, and the axis of rotation of the turnstile wheel, according to some embodiments of the invention.

FIG. 3 illustrates the relationships between linear velocity and angular velocity of the external corner belt 230 and the interior corner belt 260, and the axis of rotation 225 of the turnstile wheel 210, according to some embodiments of the invention. FIG. 3 illustrates the curved conveyance section 201 comprising a curved conveyance section entrance 310 and a curved conveyance section exit 320. A curved conveyance path is bounded by an exterior curve 330 and an interior curve 340. The exterior curve 330 represents the segment of the exterior corner belt 230 that comes in contact with the exterior turnstile wheel surface 215. The interior curve 340 represents the segment of the interior corner belt 260 that comes in contact with the interior turnstile wheel surface 220. An angle of rotation θ is specified between the curved conveyance section entrance 310 and the curved conveyance section exit 320 around the axis of rotation 225. A first endpoint A' of the exterior curve 330 is positioned at the curved conveyance section entrance 310, and corresponds to the first exterior curve point 231 shown in FIG. 2A. A second endpoint A" of the exterior curve 330 is positioned at the curved conveyance section exit 320, and corresponds to the second exterior curve point 232 shown in FIG. 2A. A first endpoint B' of the interior curve 340 is positioned at the curved conveyance section entrance 310, and a second endpoint B" of the interior curve 340 is positioned at the curved conveyance section exit 320.

In various embodiments, the time required for the interior side of the article 280 to traverse the curved conveyance section 201 along the interior curve 340 and the time required for the exterior side of the article 280 to traverse the curved conveyance section 201 along the exterior curve 330 are approximately equal; therefore the angular velocity of the exterior corner belt 230 along the exterior curve 330 and the angular velocity of the interior corner belt 260 along the interior curve 340 are approximately equal. Because an exterior curve length 332 is greater than an interior curve length 342, the linear velocity of the exterior corner belt 230 along the exterior curve 330 is greater than the linear velocity of the interior corner belt 260 along the interior curve 340.

More specifically, a linear velocity is determined by the following formula:

$$v=d/t$$

where $v$ is the linear velocity, d is a distance traveled, and t is a time required for an object (not shown) to travel the distance d. An angular velocity is determined by the following formula:

$$\omega=\theta/t$$

where ω is the angular velocity, θ is an angle between the two endpoints of the distance d traveled around a curve, and t is the time required for the object to travel the distance d.

With reference to FIG. 3, a linear velocity of the exterior corner belt 230 configured to travel along the exterior curve 330 from endpoint A' to endpoint A" is defined as the following:

$$v_A=d_A/t_A$$

where $v_A$ is the linear velocity of the exterior corner belt 230, $d_A$ is the exterior curve length 332 traveled by the exterior corner belt 230 from endpoint A' to endpoint A", and $t_A$ is a time required for the exterior corner belt 230 to travel the distance $d_A$. An angular velocity of the exterior corner belt 230 configured to travel along the exterior curve 330 from endpoint A' to endpoint A" is defined as the following:

$$\omega_A=\theta/t_A$$

where $\omega_A$ is the angular velocity of the exterior corner belt 230 configured to travel along the exterior curve 330 from endpoint A' to endpoint A", θ is an angle between the endpoint A' and the endpoint A", and $t_A$ is the time required for the exterior corner belt 230 to travel the distance $d_A$.

Likewise, a linear velocity of the interior corner belt 260 configured to travel along the interior curve 340 from endpoint B' to endpoint B" is defined as the following:

$$v_B = d_B/t_B$$

where $v_B$ is the linear velocity of the interior corner belt 260, $d_B$ is the interior curve length 342 traveled by the interior corner belt 260 from endpoint B' to endpoint B", and $t_B$ is a time required for the interior corner belt 260 to travel the distance $d_B$. An angular velocity of the interior corner belt 260 configured to travel along the interior curve 340 from endpoint B' to endpoint B" is defined as the following:

$$\omega_B = \theta/t_B$$

where $\omega_B$ is the angular velocity of the interior corner belt 260 configured to travel along the interior curve 340 from endpoint B' to endpoint B", $\theta$ is an angle between the endpoint B' and the endpoint B", and $t_B$ is the time required for the interior corner belt 260 to travel the distance $d_B$.

To enable a front surface of the article 280, which is to be parallel with the curved conveyance section entrance 310, to be parallel with the curved conveyance section exit 320 after being transported through the curved conveyance section 201, various embodiments of the present invention are configured such that the time $t_A$ required for a point on the front of the article 280 closest to the exterior curve 330 to travel from endpoint A' to endpoint A" is approximately equal to the time $t_B$ required for a point on the front of the article 280 closest to the interior curve 340 to travel from endpoint B' to endpoint B". Therefore, the angular velocity $\omega_A$ of the exterior curve 330 is approximately equal to the angular velocity $\omega_B$ of the interior curve 340. In various embodiments of the present invention, $d_A$ is greater than $d_B$, and therefore, $v_A$ is greater than $v_B$ if $t_A$ and $t_B$ are approximately equal.

FIGS. 4A, 4B, 4C, and 4D illustrate cross-sectional views of alternative embodiments of the exterior corner belt 230, the turnstile wheel 210, and a plurality of the exterior corner belt guide wheels 235, according to various embodiments of the invention. In these embodiments, the exterior corner belt 230 is supported on one side by the turnstile wheel 210 and supported on the other side by one or more turnstile wheels 210. In various embodiments, the exterior corner belt 230 may be supported and/or guided by either the turnstile wheel 210 or the exterior corner belt guide wheel 235, or both the turnstile wheel 210 and the exterior corner belt guide wheel 235. Many variations from the illustrated embodiments of the exterior corner belt 230, the turnstile wheel 210, and the exterior corner belt guide wheels 235 are within the scope of this disclosure.

FIG. 4A illustrates various embodiments of the exterior corner belt guide wheel 235 and the exterior corner belt 230. In these embodiments, the exterior corner belt guide wheels 235 include a circular surface 410, rotate around a vertical rotation axis 430 and include a notch or groove, such as a wheel V-groove 420, configured to receive a protruding part 440 of the exterior corner belt 230. The wheel V-groove 420 includes a combined circular/support surface 415 configured to support the exterior corner belt 230. The combined circular/support surface 415 carries the weight of the exterior corner belt 230 and, through a plurality of support protrusions 460 disposed on the exterior corner belt 230, the weight of the articles 280. The support protrusions 460 are configured to support the articles 280, which may rest on a support protrusion surface 465. The support protrusion surface 465 optionally includes a low friction coating (not shown). In some embodiments, the support protrusion surface 465 is disposed a distance 480 below an upper edge 485 of the exterior corner belt 230. As such, part of the article 280 transported may be below part of the exterior corner belt 230. In various embodiments, the distance 480 is equal to or great than zero, 10, 20, or 50 mm. The exterior corner belt guide wheels 235 may be configured to support the exterior corner belt 230 on two sides, as illustrated in FIG. 4A, or on a single side.

In typical embodiments, the exterior corner belt 230 further comprises a belt V-groove 470. The belt V-groove 470 is configured to receive and be supported by an external turnstile wheel support protrusion 490 disposed along the external turnstile wheel surface 215. The external turnstile wheel support protrusion 490 includes a combined external turnstile circular/support surface 495 configured to support the exterior corner belt 230.

In various embodiments, the exterior corner belt guide wheels 235 may be configured to be taller than, equal in height to, or shorter than the exterior corner belt 230.

FIG. 4B illustrates a cross-sectional view of alternative embodiments of the exterior corner belt guide wheel 235 and the exterior corner belt 230. These embodiments include an optional capture lip 450. The capture lip 450 is optionally included in other embodiments illustrated herein. The capture lip 450 is attached to the exterior corner belt 230 and is configured to restrict the vertical movement of the article 280. The capture lip 450 is optionally connected to the support protrusions 460. In alternative embodiments, the capture lip 450 is attached to a separate, optionally stationary, support structure (not shown).

Figure 4D:
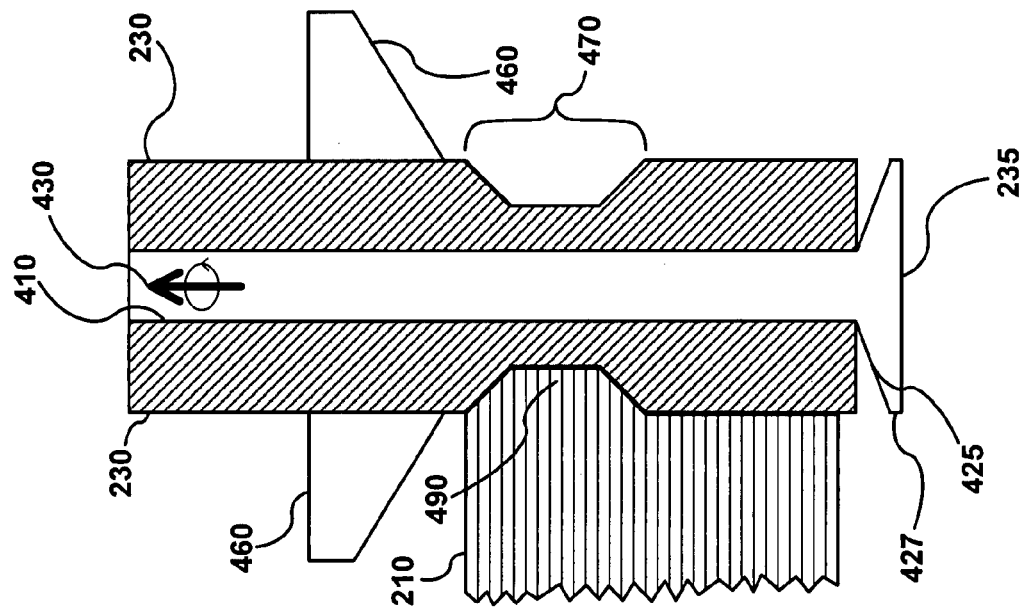
Figure 4C:
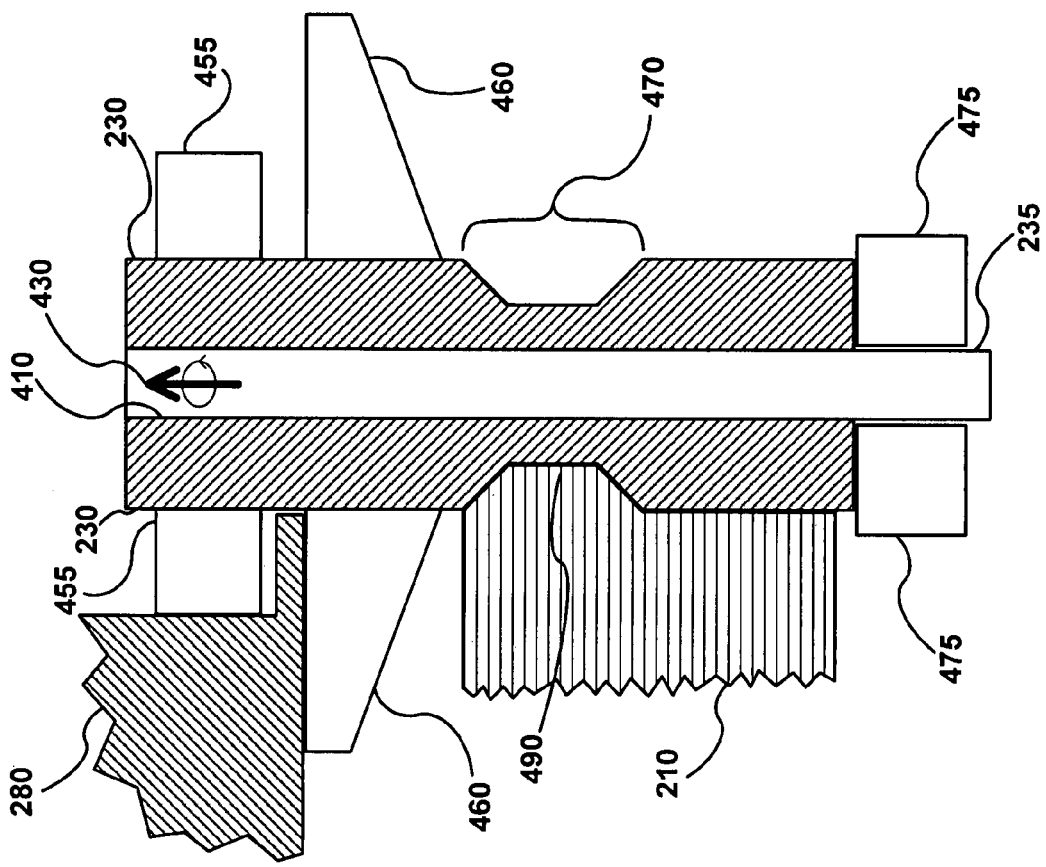

FIG. 4C illustrates a cross-sectional view of alternative embodiments of the exterior corner belt guide wheel 235 and the exterior corner belt 230. These embodiments include an optional support 475. The support 475 is configured to support the exterior corner belt 230 when in contact with the exterior corner belt guide wheel 235 and/or the turnstile wheel 210. In some embodiments, the support 475 includes a stationary low friction surface on which the exterior corner belt 230 is configured to slide. In some embodiments, support 475 includes rolling elements such as ball bearings, or horizontally disposed rollers (not shown). These horizontally disposed rollers are optionally smaller and more closely spaced than the exterior corner belt guide wheels 235.

In some embodiments, the exterior corner belt 230 is configured to include an optional capture element 455. The capture element 455 is optionally connected to support protrusions 460. The capture element 455 is configured to apply pressure against a side of the article 280 in order to hold the article 280 securely between the exterior corner belt 230 and the interior corner belt 260 (shown in FIG. 2A). The capture element 455 is typically a compliant material such as urethane.

FIG. 4D illustrates a cross-sectional view of alternative embodiments of the exterior corner belt guide wheel 235 and the exterior corner belt 230. In these embodiments, the exterior corner belt guide wheels 235 are configured to include a support surface 425. The support surface 425 is configured to support the exterior corner belt 230 and rotate around the vertical rotation axis 430 simultaneously and in synchronization with the circular surface 410. The support surface 425 is optionally configured to be perpendicular to the vertical rotation axis 430 or taper downward (as shown) toward an outside edge 427 of the exterior corner belt guide wheel 235. The outside edge 427 may optionally be configured to be a distance from the vertical rotation axis 430 less than, equal to, or greater than the width of any portion of the exterior corner belt

230. The support surface 425 optionally comprises a low friction material such as Teflon™. The support surface 425 is configured to carry the weight of the exterior corner belt 230.

In various embodiments, the interior turnstile wheel surface 220 and the interior corner belt 260 may have profiles similar to those illustrated herein for the exterior turnstile wheel surface 215 and the exterior corner belt 230. In various embodiments, the exterior turnstile wheel surface 215 may comprise an external turnstile wheel V-groove (not shown) similar to wheel V-groove 420 in addition to or instead of the external turnstile wheel support protrusion 490, and the external corner belt 230 may further comprise a protruding part (not shown) similar to protruding part 440 configured to mate with the external turnstile wheel V-groove. This further protruding part (not shown) may be disposed on the external corner belt 230 in addition to or instead of the belt V-groove 470.

Figure 5A:
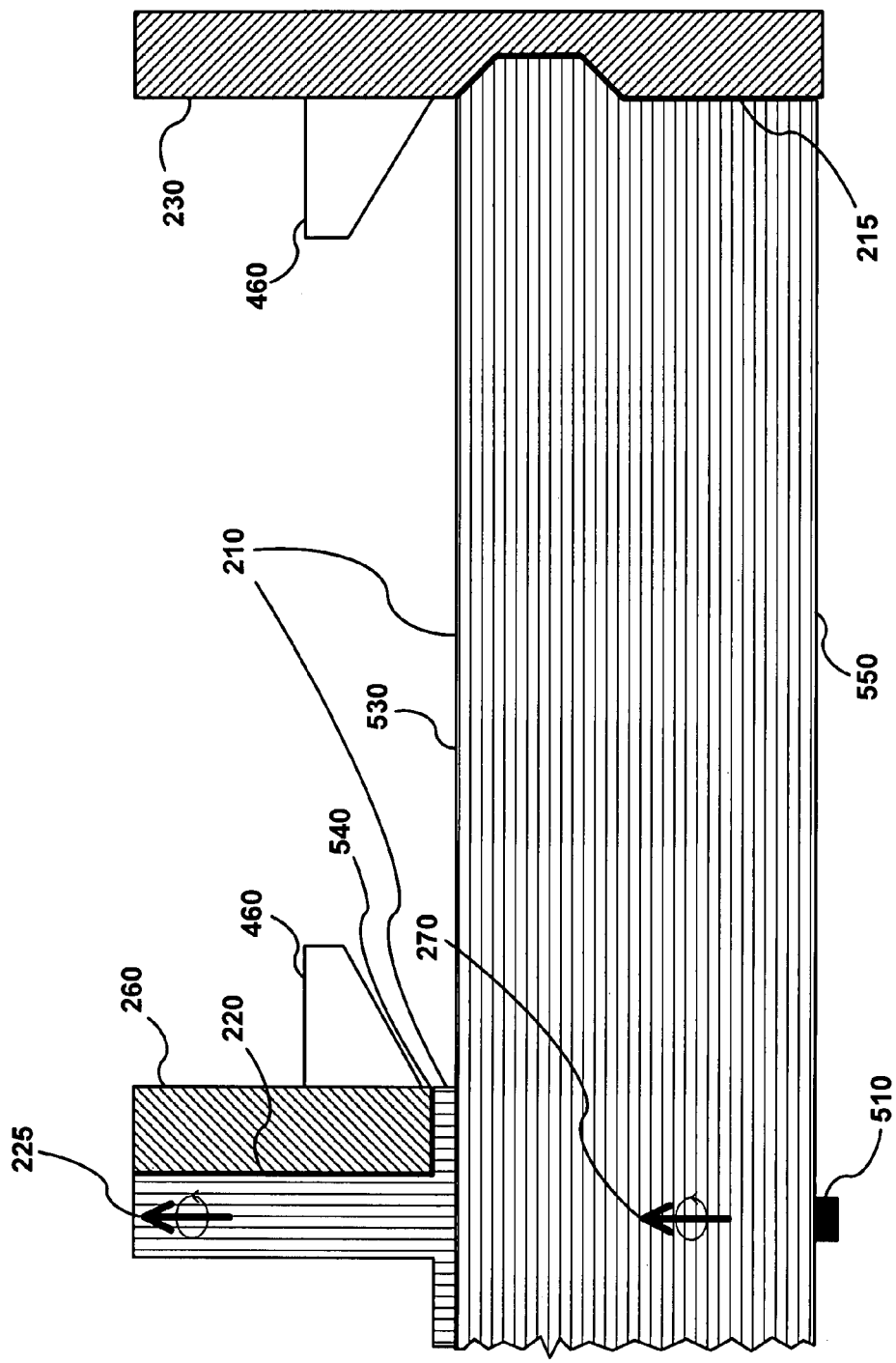
FIGS. 5A and 5B illustrate cross-sectional views of alternative embodiments of a turnstile wheel, an interior corner belt, and an exterior corner belt, according to various embodiments of the invention.
Figure 5B:
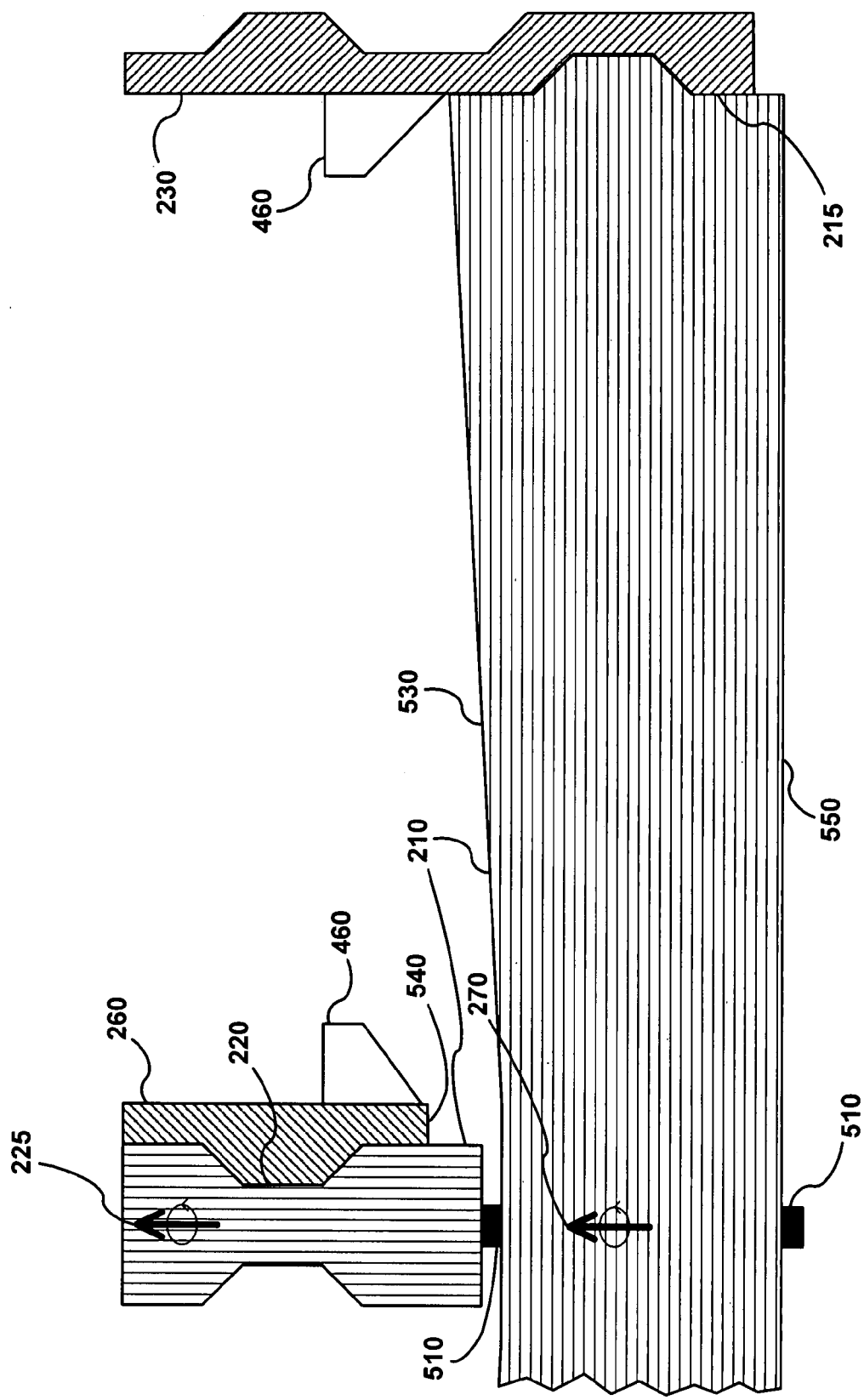

FIGS. 5A and 5B illustrate cross-sectional views of alternative embodiments of the turnstile wheel 210, the interior corner belt 260, and the exterior corner belt 230. The turnstile wheel 210 comprises the external turnstile wheel surface 215 and the internal turnstile wheel surface 220. The exterior turnstile wheel surface 215 and the interior turnstile wheel surface 220 are configured to rotate about the same axis of rotation 225. In various embodiments, the exterior turnstile wheel surface 215 and the interior turnstile wheel surface 220 are coupled with a spindle 510.

In various embodiments, the exterior turnstile wheel surface 215 and the interior turnstile wheel surface 220 may be physically coupled to one another as shown in FIG. 5A. In some embodiments, the exterior turnstile wheel surface 215 and the interior turnstile wheel surface 220 may be integrated. For example, the exterior turnstile wheel surface 215 and the interior turnstile wheel surface 220 may be portions of a single manufactured part that comprises the functions of both.

In various embodiments, the exterior turnstile wheel surface 215 and the interior turnstile wheel surface 220 may be physically decoupled while rotating about the same axis of rotation 225, as shown in FIG. 5B. For example, the exterior turnstile wheel surface 215 and the interior turnstile wheel surface 220 may be physically decoupled from one another, while the exterior turnstile wheel surface 215 and the interior turnstile wheel surface 220 are coupled to a common spindle 510.

In some embodiments, the exterior turnstile wheel surface 215 may be coupled to the spindle 510 while the interior turnstile wheel surface 220 may be coupled a separate spindle (not shown).

In some embodiments, the exterior turnstile wheel surface 215 and the interior turnstile wheel surface 220 rotate under the power of a common power source. In other embodiments, the exterior turnstile wheel surface 215 and the interior turnstile wheel surface 220 rotate under the power of independent power sources.

In various embodiments, the interior turnstile wheel surface 220 and the exterior turnstile wheel surface 215 are configured to position the support protrusions 460 attached to the interior corner belt 260 and the support protrusions 460 attached to the exterior corner belt 230 at an approximately same height relative to one another.

In various embodiments, a turnstile wheel top surface 530 is configured to be approximately horizontal, and thus, perpendicular to the axis of rotation 225 from the interior corner belt 260 to the external turnstile wheel surface 215. In various embodiments, the turnstile wheel top surface 530 is sloped upward or downward from the interior corner belt 260 to the external turnstile wheel surface 215. In various embodiments, the turnstile wheel top surface 530 may be irregular in height. Typically, the maximum height of the turnstile wheel top surface 530 between the interior corner belt 260 and the external corner belt 230 is configured to be below a bottom surface 540 of the interior corner belt 260.

In various embodiments, a turnstile wheel bottom surface 550 is configured to be approximately horizontal, and thus, perpendicular to the axis of rotation 225 from the spindle 510 to the external turnstile wheel surface 215. In various embodiments, the turnstile wheel bottom surface 550 is sloped upward or downward from the spindle 510 to the external turnstile wheel surface 215. In various embodiments, the turnstile wheel bottom surface 550 may be irregular in height.

In various embodiments, the exterior corner belt 230, the interior corner belt 260, the exterior entrance belt 240, the exterior exit belt 250, the turnstile wheel 210, the exterior corner belt guide wheels 235, the exterior entrance belt guide wheels 245, the interior corner belt guide wheels 265, and the exterior exit belt guide wheels 255 may comprise any characteristics of the vertical belts disclosed in patent application Ser. No. 11/406,569, which is incorporated herein by reference.

Figure 6:
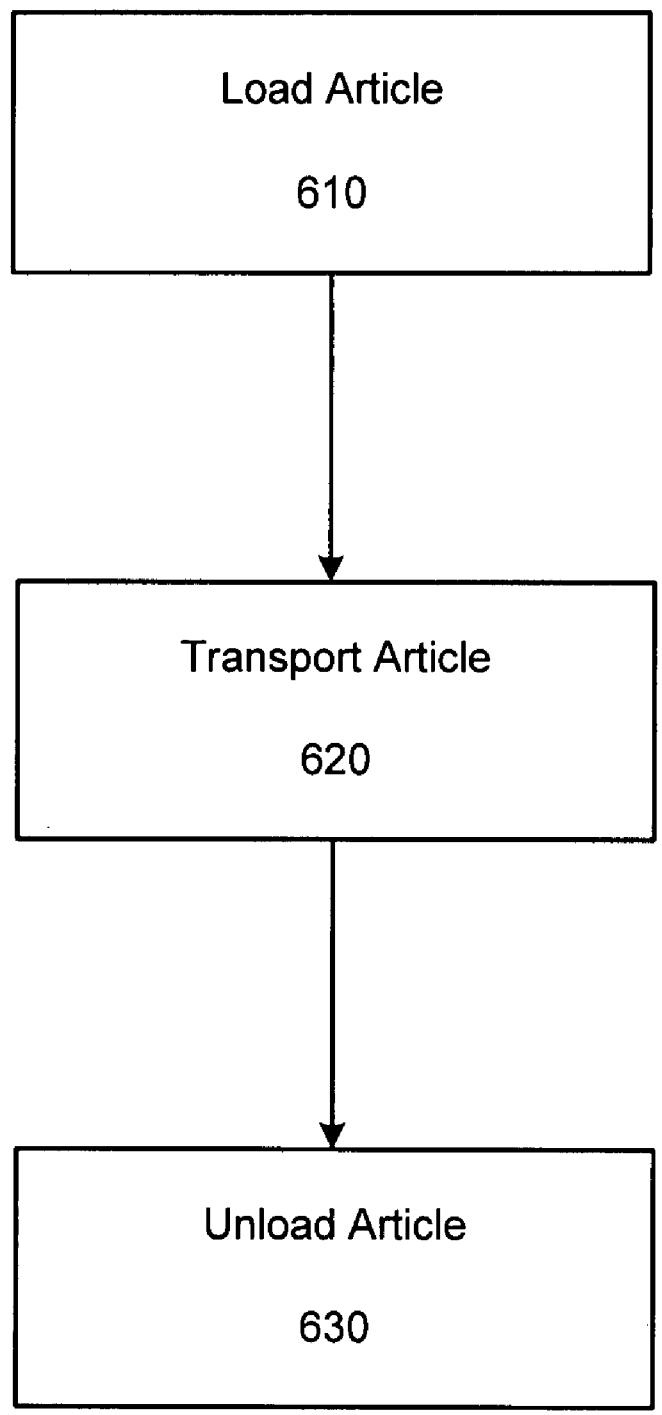
FIG. 6 illustrates methods of conveying articles through a corner, according to various embodiments of the invention.

FIG. 6 illustrates methods of conveying articles through a corner, according to various embodiments of the invention. In these methods, the article is loaded onto a transport system comprising a corner such as those described elsewhere herein, transported through the curved conveyance section 201, and unloaded. In some embodiments, these methods enable the articles to traverse the corner without significantly slowing or without momentarily stopping, thereby enabling the articles to be more closely spaced and enabling more articles to pass through the corner in a given unit of time than in the prior art.

In step 610, articles to be conveyed are placed on a conveyance section of a transport cornering system such as the transport cornering system 200. The articles are optionally loaded onto a section of the transport cornering system 200 by another transport system configured to be adjacent to both exterior entrance belt 240 and interior corner belt 260. The articles are optionally placed at a section of an embodiment of the transport cornering system 200 specifically configured for loading and unloading articles. In various embodiments, the transport section on which the articles are placed comprise the exterior entrance belt 240, the at least one exterior entrance belt guide wheel 245, the interior corner belt 260, and the at least one interior corner belt guide wheel 265.

In step 620, the article loaded in step 610 is transported along a conveyance path through the curved conveyance section 201. In various embodiments, the curved conveyance section 201 comprises the turnstile wheel 210, the interior corner belt 260, and the exterior corner belt 230. The turnstile wheel 210 comprises an external turnstile wheel surface 215 and an internal turnstile wheel surface 220. The exterior turnstile wheel surface 215 and the interior turnstile wheel surface 220 are configured to rotate about the same axis of rotation 225. The exterior turnstile wheel surface 215 and the interior turnstile wheel surface 220 are further configured along with the exterior corner belt 230 and the interior corner belt 260 to convey the article through the curved conveyance section 201, the article rotating about the axis of rotation 225. The conveyance path is optionally traversed without slowing or without momentarily stopping the article.

In step 630, articles to be conveyed are unloaded from the conveyance section of a transport cornering system such as the transport cornering system 200. The articles are optionally unloaded from a section of the transport cornering system 200 by another transport system configured to be adjacent to both the exterior exit belt 250 and the interior corner belt 260. The articles are optionally unloaded from a section of an embodiment of the transport cornering system 200 specifically configured for loading and unloading articles. In various embodiments, the transport section from which the articles are unloaded comprise the exterior exit belt 250, the at least one exterior exit belt guide wheel 255, the interior corner belt 260, and the at least one interior corner belt guide wheel 265.

Several embodiments are specifically illustrated and/or described herein. However, it will be appreciated that modifications and variations are covered by the above teachings and within the scope of the appended claims without departing from the spirit and intended scope thereof. For example, while the transportation of FOUPs in semiconductor manufacturing have been used herein as an illustrative example, systems and methods of the invention may be configured for transporting alternative materials, such as for example, substrates for the manufacture of liquid crystal, organic light emitting diode or other types of display devices, a memory substrate (such as a hard drive platter substrate or an optical storage device substrate), a photovoltaic device substrate, a battery substrate, or the like.

Further, the vertical rollers and vertical belts discussed herein need not be perfectly vertical. The spacing of vertical rollers as illustrated herein is for illustrative purposes only. In various embodiments, vertical rollers may be disposed in a wide variety of spacings, from closely packed to widely dispersed including a single roller or rollers located only at each end of a belt. In various embodiments, the transport system may comprise straight, horizontal, inclined, and/or declined sections configured to deliver articles to or receive articles from the curved conveyance section 201.

In various embodiments, the curved conveyance section 201 may transport articles along a continuously curved path through a turn of up to and including ten (10) degrees, up to and including forty-five (45) degrees, up to and including ninety (90) degrees, or up to and including one hundred eighty (180) degrees. In various embodiments, the curved conveyance section 201 may be curved to the left or to the right of the initial conveyance path in the entrance conveyance section 202. In various embodiments, a transition region may be disposed between the curved conveyance section 201 and the exit conveyance section 203. This transition region is substantially similar to the transition region 270 disposed between the entrance conveyance section 202 and the curved conveyance section 201. In some embodiments, the transport cornering system 200 may be configured to transport a plurality of the articles 280 in both forward and backward directions by reversing the direction of rotation of the turnstile wheel 210, the plurality of exterior corner belt guide wheels 235, the plurality of interior corner belt guide wheels 265, the plurality of exterior exit belt guide wheels 255, and the plurality of exterior entrance belt guide wheels 245.

In various embodiments, the transport cornering system 200 is configured to transport at least 6, 12, 15, or 30 FOUPs per minute.

In various embodiments, the each of the various belts discussed herein may be replaced by two or more belts. Likewise, each of the various belts discussed herein may be replaced by a combination of belt(s) and guide wheel(s), the guide wheels configured to support a FOUP directly without use of a belt between the guide wheel and FOUP. In various embodiments, any one or more of the belts discussed herein are each supported by more than two guide wheels. In various embodiments, any one or more of the belts discussed herein are horizontal rather than vertical belts.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A curved conveyance section comprising:
   an exterior corner belt disposed on an exterior edge of the curved conveyance section, and configured to guide an article to be conveyed;
   an interior corner belt disposed on an interior edge of the curved conveyance section, and configured to guide the article to be conveyed;
   a first surface configured to guide the exterior corner belt along a continuously curved path;
   a second surface configured to guide the interior corner belt along a continuously curved path, the first surface and the second surface being configured to rotate at a similar angular velocity.

2. The curved conveyance section of claim 1, wherein the first surface and the second surface are part of a turnstile wheel.

3. The curved conveyance section of claim 1, wherein the first surface is disposed below a curved conveyance path for the article to be conveyed.

4. The curved conveyance section of claim 1, wherein the first surface and the second surface rotate around a common axis of rotation.

5. The curved conveyance section of claim 1, wherein the exterior corner belt is configured to couple with the first surface on one side of the exterior corner belt and at least one exterior corner belt guide wheel on an opposite side of the exterior corner belt.

6. The curved conveyance section of claim 1, further comprising the article, the article including a Front Opening Unified Pod (FOUP) or a semiconductor wafer.

7. The curved conveyance section of claim 1, wherein the article includes a memory substrate, a photovoltaic substrate, a display device substrate, or a battery substrate.

8. The curved conveyance section of claim 1, wherein the exterior corner belt and the first surface are configured to transport at least six FOUPs per minute through the curved conveyance section.

9. The curved conveyance section of claim 1, further comprising the article, the article including a substrate used for manufacturing a display device.

10. The curved conveyance section of claim 1, further comprising a transition region, the transition region comprising at least one support structure configured to support the article to be conveyed through the transition region.

11. The curved conveyance section of claim 10, wherein at least one support structure comprises at least one air bearing.

12. The curved conveyance section of claim 10, wherein the at least one support structure is magnetically coupled to a drive mechanism.

13. The curved conveyance section of claim 1, wherein the interior corner belt or the exterior corner belt is a vertical belt.

14. A curved conveyance section comprising:
- an interior corner belt disposed on an interior edge of the curved conveyance section, and configured to guide an article to be conveyed along a curved conveyance path;
- an exterior corner belt disposed on an exterior edge of the curved conveyance section, and configured to guide the article to be conveyed along the curved conveyance path;
- at least one turnstile wheel configured to guide both the interior corner belt and the exterior corner belt, an axis of rotation of the at least one turnstile wheel being disposed outside of the curved conveyance path.

15. The curved conveyance section of claim 14, wherein the at least one turnstile wheel is configured to guide both the interior corner belt and the exterior corner belt along a continuously curved path.

16. The curved conveyance section of claim 14, wherein the at least one turnstile wheel is configured to move the exterior corner belt and the interior corner belt at different linear velocities.

17. A curved conveyance section comprising:
- an interior corner belt disposed on an interior edge of the curved conveyance section, and configured to transport an article to be conveyed along a curved conveyance path;
- an exterior corner belt disposed on an exterior edge of the curved conveyance section, and configured to transport the article to be conveyed along the curved conveyance path;
- at least one turnstile wheel including a first surface configured to guide the exterior corner belt and a second surface configured to guide the interior corner belt, the first surface and the second surface having a common axis of rotation.

18. The curved conveyance section of claim 17, wherein the common axis of rotation of the first surface and the second surface is outside the curved conveyance path.

19. The curved conveyance section of claim 17, wherein the interior corner belt and the exterior corner belt comprise a plurality of support protrusions configured to support the article to be conveyed.

20. The curved conveyance section of claim 19, wherein a member of the plurality of support protrusions comprises an article supporting surface that is disposed below a part of the interior corner belt or the exterior corner belt.

21. The curved conveyance section of claim 19, wherein the article to be conveyed is a FOUP and the FOUP has a lateral freedom of movement of 110 millimeters or less.

22. A method comprising:
- loading an article onto a curved conveyance section, the curved conveyance section comprising
  - an interior corner belt and an exterior corner belt configured to guide the article to be conveyed along a curved conveyance path,
  - and at least one turnstile wheel configured to guide the interior corner belt and the exterior corner belt around a common axis of rotation;
- conveying the article along the curved conveyance path through the curved conveyance section; and
- unloading the article from the curved conveyance section.

23. The method of claim 22, wherein the step of loading the article onto the curved conveyance section includes loading a Front Opening Unified Pod (FOUP), a semiconductor wafer, or a substrate configured for the manufacture of a display device.

24. The curved conveyance section of claim 22, wherein the article includes a memory substrate, a photovoltaic substrate, a display device substrate, or a battery substrate.

25. The method of claim 22, wherein the curved conveyance path is continuously curved.

26. The method of claim 22, wherein the common axis of rotation of the at least one turnstile wheel is outside the curved conveyance path.

27. The method of claim 22, wherein the curved conveyance section further comprises a capture lip disposed on or above a portion of the interior corner belt or the exterior corner belt, the capture lip being configured to restrict the vertical movement of the article to be conveyed.

28. The method of claim 22, wherein the exterior corner belt and the at least one turnstile wheel are configured to transport at least twelve FOUPs per minute through the curved conveyance section.

29. A curved conveyance section comprising:
- at least one turnstile wheel configured to guide an article to be conveyed through a curved conveyance path, the turnstile wheel comprising a first surface and a second surface, the first surface and the second surface having a common axis of rotation disposed outside of the curved conveyance path, and the second surface being disposed below the curved conveyance path.

30. The curved conveyance section of claim 29, wherein the article to be conveyed has a lateral freedom of movement of 110 millimeters or less.

31. A system comprising:
- a first conveyance section configured for transporting an article in a first direction and including at least a first vertical belt configured to travel at a first speed;
- a second conveyance section configured for transporting an article in a second direction and including at least a second vertical belt configured to travel at a second speed, the first speed being different from the second speed; and
- a transition region between the first vertical belt and the second vertical belt and including an offset section at least partially perpendicular to the first direction or the second direction, the offset section configured for the article to begin a change in direction within the transition region.

32. The system of claim 31, further including a support structure configured to support the article in the transition region.

33. The system of claim 32, wherein the support structure includes a wheel or an air bearing.

34. The system of claim 33, wherein the first conveyance section is curved.

* * * * *